Nov. 15, 1960    I. CURLETTI    2,959,811
SYSTEM FOR THE CONTINUOUS CALENDERING OF
PLASTICS SUCH AS SYNTHETIC RESINS
Filed March 26, 1958

United States Patent Office 2,959,811
Patented Nov. 15, 1960

2,959,811

SYSTEM FOR THE CONTINUOUS CALENDERING OF PLASTICS SUCH AS SYNTHETIC RESINS

Italo Curletti, Milan, Italy, assignor to Montecatini-Societa Generale per l'Industria Mineraria e Chimica, a corporation of Italy Filed Mar. 26, 1958, Ser. No. 724,129

Claims priority, application Italy Mar. 29, 1957

14 Claims. (Cl. 18—2)

The present invention relates to an improvement in the continuous calendering of plastics, for example synthetic resins, and, particularly, to the continuous production of molding compounds from thermosetting resins.

The mixing of molding compounds is generally carried out by calendering batchwise, the material being charged in given amounts into a roll mixer, between heated rolls thereof rotating at different speeds.

Due to the gradual melting of the resin, it gradually becomes plastic. Homogenization occurs in the tape of material subjected to mixing, the tape being pushed through the interspace between the two cylinders rotating in an opposite direction. The plastic material being mixed is subjected to pressure only in the interspace between the cylinders, where it is dragged by the drive cylinder, that is, the cylinder to which the sheet is then adhering.

Although this is the most commonly used method, nevertheless it presents several inconveniences. Each roll mixer requires the continuous presence of a worker to attend to the calendering, and usually also of an auxiliary worker. By use of a suitable knife, the worker removes the product and again charges it to the roll mixer.

Therefore, the time previously determined as best suited for the warm mixing of the product may undergo undesired variations which depend on the skill of the worker, who, owing to his experience, chooses the most convenient moment for discharging the product, when it appears to be finished.

Obviously, with this batch process, the elastic modulus of the calendered product does not have the required constancy.

Moreover, there are peaks of power consumption during the time elapsing from the charging of the starting solid mixture to the moment at which this mixture becomes completely plastic.

An object of the present invention is to provide an apparatus for the continuous calendering of synthetic resins which permits the elimination of the said inconveniences. Another object is the realization of an entirely automatic process.

According to the present invention, the feeding of the powders, which form the molding compounds, takes place continuously at the center of a roll mixer, the couple rolls of which rotate at a different speed and in an opposite direction, the mass formed by the powders becoming plastic and being dragged from the center of the moving roll, on which the sheet is formed, toward the roll ends, where the finished product is removed continuously as a tape.

The present invention also provides apparatus for the continuous calendering of synthetic resins. It comprises two adjacent cylinders rotating at different speeds. Along two generating lines above the cylinder on which the sheet is formed, two couples of turning knives, mounted or formed on rotating discs, are carried on the same axis or shaft, and two end knives for cutting the calendered sheet are arranged in correspondence with two end regions of the cylinder, where the finished product is removed, and with the frontal generating line of the same cylinder.

The action of the said turning knives is essential for the present invention, since the action causes the calendered sheet, during its translation from the center to the opposite ends of the moving cylinder, to undergo two intensive mixings, which render possible an effective mixing, and the obtainment of a homogeneous product having constant physical characteristics.

The accompanying schematic drawings serve to illustrate one mode of execution of the present invention, without limiting its scope.

Like reference letters indicate the same parts in the various figures.

Figs. 1, 2 and 3 illustrate a pair of coupled rotating disc knives $Z_I$ and $Z_{II}$ whose cutting circumferences comprise or are provided with chisel edges. They are oriented in such a way that the calendered sheet, after it is cut by the knives, is forced by the tilt of the disc to move obliquely, the flat faces of the knives functioning in this way as ploughshares having a turning-over action.

Figure 1:
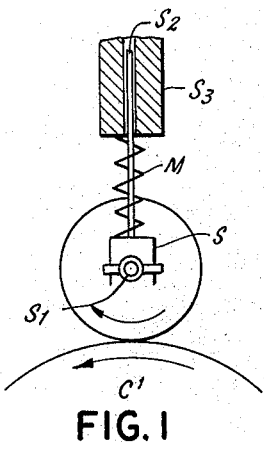
Fig. 1 is a schematic vertical view orthogonal to the rotational axis of the cylinders, illustrating the mounting of a knife couple, the knives rotating in a direction contrary to that of the drive cylinder. For simplicity of illustration the two knives are shown with their axes in non-oblique position.
Figure 2:
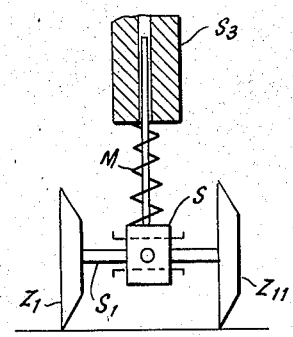
Fig. 2 represents a schematic, vertical, longitudinal view taken along the generating line of the cylinder of the apparatus shown in Fig. 1.
Figure 3:
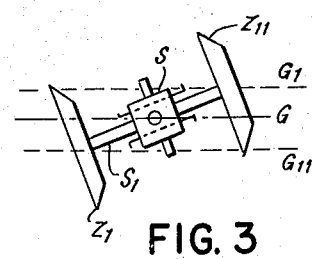
Fig. 3 is a plan view of the apparatus illustrated in Figs. 1 and 2, illustrating the oblique position.
Figure 5:
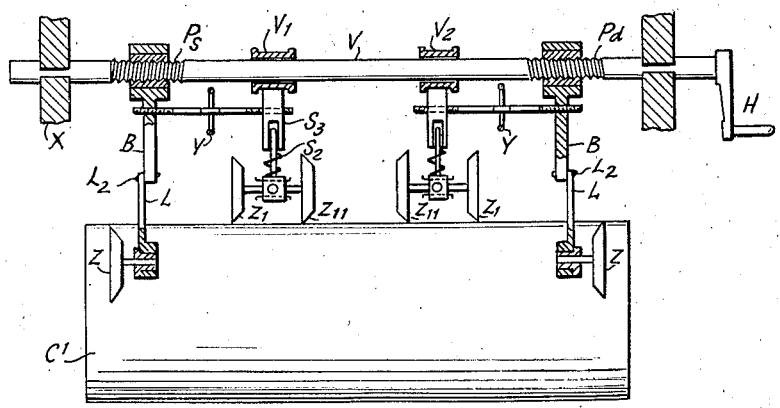
Fig. 5 represents a schematic longitudinal, vertical view of the apparatus carrying the rotating cutting end knives and the two pairs of intermediate turning knives arranged above the upper generating line of the cylinder on which the sheet is formed.

Each pair of knives $Z_I$ and $Z_{II}$ is mounted idle on the same axle V (Fig. 5) by means of sleeves $V_1$, $V_2$ (Fig. 5). This axle is mounted above the upper generating line G (Fig. 3) of the cylinder C' on which the sheet is formed, and, because of the oblique position of the knives $Z_I$ and $Z_{II}$ in relation to the axis of the cylinder C', the contact points of the knives rotate on two different generating lines $G_I$ and $G_{II}$.

In order to render possible the balanced and contemporaneous resting of said knives $Z_I$ and $Z_{II}$ on the said generating lines, the axles $S_1$ of these knives are mounted on universal joints S, one being provided for each pair of knives. Rods $S_2$ are attached to joints S.

The two pairs of coupled turning-over knives therefore form two separate assemblies, one independent of the other, which can be moved obliquely as desired. They may be removed, if necessary, by means of suitable handwheels Y (Fig. 5).

The relatively low pressure exerted by knives $Z_I$ and $Z_{II}$ on cylinder C' of the roll mixer is determined by two calibrated compression springs M, bearing between the respective joints S and part $S_3$. These springs cooperate with the knives in cutting and turning over the product. They also permit easy jumping over, or passage over, impurities that may pass under the knives, thus avoiding damage to the latter.

Owing to the turning-over action of knives $Z_I$, $Z_{II}$, the calendered sheet, while it moves from the center to the ends of cylinder C' on which the sheet is formed, undergoes two types of mixing, i.e., the mixing caused by the oblique position of knives $Z_I$, $Z_{II}$ and the immediately succeeding mixing caused by the different speeds of the two cylinders C' and C. In this way there results a more intensive mixing and a better homogenization than that obtained by prior methods.

Figure 4:
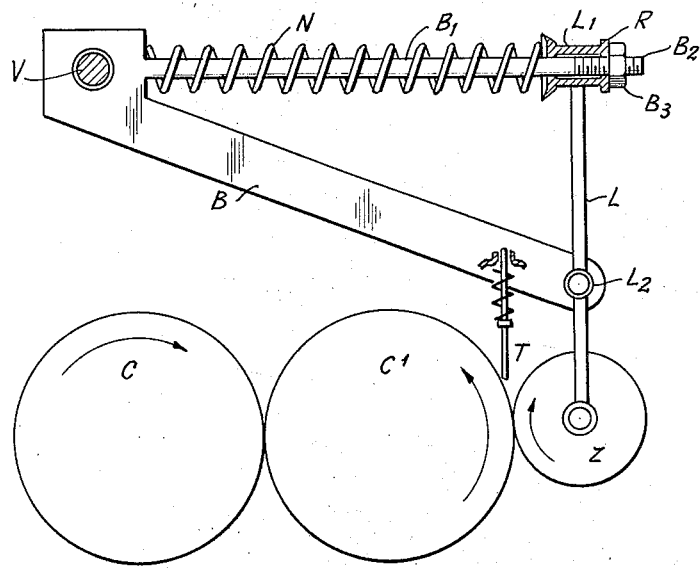
Fig. 4 is a transverse vertical view of a pair of adjacent cylinders of the roll mixer, and of a rotating cutting end knife.

Figs. 4 and 5 show the arrangement, in relation to cylinder C', of the two knives Z, Z which cut the sheet when it is finished, and when it has reached the two ends of the cylinder C'. Knives Z, Z are respectively carried by oscillating levers L, which pivot on levers B, B at $L_2$.

Similarly to the coupled turning-over knives $Z_I$, $Z_{II}$ described above, the rotating disc knives Z, Z are provided with cutting edges having the shape of a chisel. The flat face of each knife Z, Z is directed to the outside, that is toward each end of cylinder C'.

As soon as these rotating knives Z, Z cut the resin sheet, suitable scrapers T (Fig. 4), also having the shapes of chisels, skim the directrix of the cutting, to remove the slices of resin from the cylinder.

The pressure of the rotating end knives Z, Z is determined by suitable springs N which thrust against the sleeves respectively fixed upon the upper ends of the oscillating levers L. This pressure is considerably greater than that of knives $Z_I$, $Z_{II}$.

A special system, including regulator R, permits each knife Z to jump over impurities which cannot be cut; but the system is so designed that the total pressure of each knife Z cannot bear against cylinder C', in order to avoid quick or easy wearing of the cutting edge, and to avoid the notching of cylinder C'.

During the operation of the roll mixer both knives Z, Z can be moved symmetrically, and at the same time, along the generatrix of cylinder C', in order to permit the selection of the best cutting position, corresponding to the desired degree of plasticity of the calendered sheet.

Each of the two end knives Z, Z, together with its corresponding downwardly spring-pressed scraper T (only one of which is shown in the drawing; see Fig. 5) is supported at a respective end region of the cylinder C' on which the sheet is formed. This support is provided by the two lever brackets B, B which are carried by the axle V that also mounts the four knives $Z_I$, $Z_{II}$. The axle V is rotatably supported by fixed structures X, X, and is rotated by handwheel H (Fig. 5), placed outside the machine. Each lever B is provided with screw threads which mate respectively with screw threads Ps or Pd of axle V. Threads Ps and Pd have left and right screwing action respectively. Knives Z, Z therefore can be moved toward and away from the ends of the cylinder C' independently of the disposition of the pairs of coupled knives $Z_I$, $Z_{II}$. Fixed to each lever B is an upper arm $B_1$ having a threaded end $B_2$. Regulating nuts $B_3$, only one of which is shown, bear adjustably against respective sleeves $L_I$, only one of which is shown. The two cylinders C and C' of the roll mixer rotatable at different speeds and in opposite direction have the same diameter so that the faster rotating cylinder C' has a greater linear peripheral speed than cylinder C. Cylinder C' is power driven from a motor while cylinder C is driven by the axis of cylinder C' through conventional gears not shown in the drawing.

Handwheels Y of Fig. 5 allow exclusively the rectilinear displacement of the two pairs of coupled turning-over knives, consequently they can be withdrawn from or moved toward the median transverse line of cylinder C' while in their oblique position. This operation is accomplished as follows: Each wheel Y has two screw threads on its axle, as shown in Fig. 5. The screw thread on one side connects with the support of an end knife Z. The screw thread on the other side connects with the support for one pair of the knives $Z_I$, $Z_{II}$. Consequently, when a handwheel Y is turned, the respective pair of knives $Z_I$, $Z_{II}$ is caused to approach or to move away from the corresponding knife Z parallelly of the axis of cylinder C', because of the sliding fit of respective sleeves $V_1$ and $V_2$ in axle V of handwheel H.

As indicated above, by turning handwheel H the cutting knives Z, Z can be caused to approach or move back from the median transverse plane of cylinder C'. However, in such operation the pairs of turning-over knives $Z_I$ and $Z_{II}$ are also displaced, because they are operatively connected to each other by the axles of handwheels Y.

The relatively low pressures exerted by knives $Z_I$, $Z_{II}$ on cylinder C' of the roll mixer are determined and measured by calibrated springs M.

The control of the oblique position of knives $Z_I$, $Z_{II}$ is performed solely by rods $S_2$ rigidly attached to universal joints S, which support the axis $S_I$ and on which are keyed knives $Z_I$, $Z_{II}$. $S_2$ is hand operated (by means not shown) also during functioning of the apparatus.

Discs $Z_I$, $Z_{II}$ are kept parallel to each other on the common axle $S_I$ but are not free to turn on it; however axis $S_I$ can rotate in an axle box carried by universal joint S.

As mentioned before, owing to these turning knives $Z_I$, $Z_{II}$ the calendered sheet, during its movement from the central portion of the nip between the pair of calendering rollers to the ends of cylinder C' on which the sheet is formed, undergoes two types of mixing, namely the mixing caused by the oblique position of knives $Z_I$, $Z_{II}$ and the immediately successive mixing caused by the different speeds of the two cylinders C' and C; in this way a more intensive mixing and a better homogenization than was previously obtainable may be achieved.

The continuous process and apparatus of the invention results in a marked increase in output of the roll mixer with the same power input, reduced labor requirements, consistency in and control of physical characteristics of the calendered product, and uniform usage of power, that is, with the avoidance of power peaks.

I claim:

1. An apparatus for continuous calendering of a thermosetting resin, the resin being initially plastic upon gradual heating to melting, comprising two adjacent heated cylinders rotating in opposite rotational directions at different linear peripheral speeds, the resin being introduced between the cylinders at the central portion thereof, between their ends, the cylinder having the greater peripheral speed being the driving cylinder on which the resin sheet being made is formed, two pairs of idling rotating disc knives, the pairs of knives and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, and rotating, transverse cutting knives mounted adjacent opposite end regions of the driving cylinder thereof, a mounting shaft extending longitudinally lengthwise of the cylinders, two support brackets respectively having left and right directed screw-thread pivot connection with the shaft, means to turn the shaft to move the support levers conjointly toward and away from the opposite ends of the driving cylinder, upwardly-downwardly extending pivot arms pivoted upon the brackets, said arms having axial pivots for the transverse cutting knives, said arms providing pivot adjustment of said knives toward the driving cylinder, the brackets having support arms extending transversely of and above the cylinders, end abutment means on said arms adjustable lengthwise thereof, and spring means forcing the upper ends of the pivot arms toward the abutment means.

2. An apparatus for continuous calendering of a thermosetting resin, the resin being initially plastic upon gradual heating to melting, comprising two adjacent heated cylinders rotating in opposite rotational directions at different linear peripheral speeds, one of the cylinders being the driving cylinder on which the resin sheet being made is formed, two pairs of idling rotating disk knives, the pairs and the knives of each pair being mutually spaced lengthwise of the driving cylinder and being in contact with the resin sheet thereon, separate means for mounting each pair of said disc knives on said apparatus, the mounting means being adjustable to permit the oblique positioning of the disc knives with respect to the direction of said generatrix, said separate means comprising an axial member for each pair of knives, the knives of each pair being carried on the respective member in parallel with each other, the mounting means comprising a universal joint for each axial member permitting conjoint movement of each pair of knives obliquely as recited and also conjoint tilting movement about an axis transverse to the driving cylinder, and longitudinally spaced, transverse cutting knives disposed frontally of the driving cylinder at end regions thereof, the said two pairs of rotating disc knives being disposed inwardly of the end regions, the pairs of rotating disc knives having bevel knife edges providing inwardly directed angular bevel edges.

3. A calendering apparatus for continuous calendering of a thermosetting resin, the resin being initially plastic upon gradual heating to melting, the apparatus comprising two adjacent heated cylinders rotating in opposite rotational directions at different linear peripheral speeds, idling, first rotating disc knives mutually spaced longitudinally of one of the cylinders, said knives having beveled knife edges providing inwardly directed angular bevel edge surfaces respectively facing toward each other and substantially flat surfaces respectively facing away from each other, rotatable means for mounting said knives so that they can be adjustably positioned obliquely of the axis of the said one cylinder, and transverse cutting knives disposed adjacent end regions of the said one cylinder.

4. A calendering apparatus for continuous calendering of a thermosetting resin, the resin being initially plastic upon gradual heating to melting, the apparatus comprising two adjacent heated cylinders rotating in opposite rotational directions at different linear speeds, idling, first rotating disc knives mutually spaced longitudinally of the faster one of the cylinders, said knives having beveled knife edges providing inwardly directed angular bevel edge surfaces respectively facing toward each other and substantially flat surfaces respectively facing away from each other, rotatable means for mounting said knives so that they can be adjustably positioned obliquely of the axis of the said one cylinder, and transverse cutting knives disposed adjacent end regions of the said one cylinder, the transverse cutting knives having bevel knife edges each providing a respective angular bevel edge surface facing toward the flat surface of one of the first rotating disc knives.

5. An apparatus for continuous calendering of a thermoplastic resin, the resin being initially plastic upon gradual heating to melting, comprising two adjacent heated cylinders rotating in opposite rotational directions at different linear speeds, the resin being introduced between the cylinders at the central portion thereof, between their ends, the faster one of the cylinders being the driving cylinder on which the resin sheet being made is formed, two pairs of idling rotating disc knives, the pairs and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, said disc knives having beveled knife edges providing inwardly directed angular bevel edge surfaces respectively facing toward each other, said obliquely disposed idling disc knives effecting the turning over of the resin and movement thereof along the driving cylinder.

6. An apparatus for continuous calendering of a moulding powder which ultimately forms a thermosetting resin upon heating, comprising two adjacent heated cylinders rotating in opposite rotational directions at different linear peripheral speeds, the resin being introduced between the cylinders at the central portion thereof, between their ends, the cylinder having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, and being disposed above a generatrix of the said driving cylinder, means for mounting each pair of said disc knives on said apparatus, the mounting means permitting the oblique positioning of the disc knives with respect to the direction of said generatrix, said obliquely disposed idling disc knives effecting the turning over of the resin and movement thereof along the driving cylinder.

7. An apparatus for continuous calendering of a moulding powder which ultimately forms a thermosetting resin upon heating, comprising two adjacent heated cylinders rotating at different linear speeds in opposite rotational directions, the cylinder having the higher linear speed being the driving cylinder on which the resin sheet being made is formed, at least two pairs of idling rotating disc knives, the pairs and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, and hand operated means mounted on said apparatus for adjustment longitudinally of the driving cylinder, said hand operative means being operative while the calendering is in operation, said obliquely disposed idling disc knives effecting the turning over of the resin and movement thereof along the driving cylinder.

8. An apparatus for continuous calendering of a resin, the resin being at least initially plastic upon gradual heating to melting, comprising two adjacent heated cylinders rotating in opposite rotational directions at different linear peripheral speeds, the one having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, separate means for mounting each pair of said disc knives on said apparatus, the mounting means being adjustable to permit the oblique positioning of the disc knives with respect to the direction of a generatrix of said driving cylinder, and spring means pressing each pair toward the driving cylinder, said obliquely disposed idling disc knives effecting the turning over of the resin and movement thereof along the driving cylinder.

9. An apparatus for continuous calendering of a resin, the resin being at least initially plastic upon gradual heating to melting, comprising two adjacent heated cylinders rotating in opposite rotational directions at different linear speeds, the one having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, separate means for mounting each pair of said disc knives on said apparatus, the mounting means being adjustable to permit the oblique positioning of the disc knives with respect to the direction of a generatrix of the driving cylinder, said separate means comprising an axial member for each pair of knives, the knives of each pair being carried on the respective member in parallel with each other, the mounting means comprising a universal joint for each axial member permitting conjoint movement of each pair of knives obliquely as recited and also conjoint tilting movement about an axis transverse to the driving cylinder, said obliquely disposed idling disc knives effecting the turning over of the resin and movement thereof along the driving cylinder.

10. An apparatus for continuous calendering of a moulding powder which ultimately forms a thermosetting resin upon heating, comprising two adjacent heated cylinders rotating in opposite rotational directions at different linear peripheral speeds, the resin being introduced between the cylinders at the central portion thereof, between their ends, the cylinder having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, said obliquely disposed idling disc knives effecting the turning over of the resin and movement thereof along the driving cylinder, and means individual to each pair of disc knives to yieldingly urge each pair toward the driving cylinder.

11. An apparatus for continuous calendering of a resin, the resin being at least initially plastic upon gradual heating to melting, comprising two adjacent cylinders rotating in opposite rotational directions at different linear speeds, the one having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, said mounting means comprising separate axle means for each pair of knives, and universal joint means for the respective axle means, said obliquely disposed idling disc knives effecting the turning over of the resin and movement thereof along the driving cylinder, and spring means yieldingly urging said disc knives toward the driving cylinder.

12. The apparatus defined in claim 9, and means yieldingly urging each pair of knives toward the driving cylinder.

13. An apparatus for continuous calendering of a resin, the resin being at least initially plastic upon gradual heating to melting, comprising two adjacent heated cylinders rotating in opposite rotational directions at different linear peripheral speeds, the faster one of the cylinders being the driving cylinder on which the resin sheet being made is formed, two pairs of idling rotating disc knives, the pairs and the knives of each pair being mutually spaced lengthwise of the driving cylinder and being in contact with the resin sheet thereon, separate means for mounting each pair of said disc knives on said apparatus, the mounting means being adjustable to permit the oblique positioning of the disc knives with respect to the direction of said generatrix, said disc knives having beveled knife edges providing inwardly directed angular bevel edge surfaces respectively facing toward each other, and transverse idling cutting knives disposed adjacent end regions of said driving cylinder outside of respective pairs of said disc knives, said obliquely disposed idling disc knives effecting the turning over of the resin and movement thereof along the driving cylinder, and spring means yieldingly urging each pair of said idling disc knives toward the driving cylinder.

14. An apparatus for continuous calendering of a resin, the resin being at least initially plastic upon gradual heating to melting, comprising two adjacent heated cylinders rotating in opposite rotational directions at different linear peripheral speeds, the resin being introduced between the cylinders at the central portion thereof, between their ends, the cylinder having the greater linear speed being the driving cylinder on which the resin sheet being made is formed, two pairs of idling rotating disc knives, the pairs and the knives of each pair being mutually spaced lengthwise of the driving cylinder and being in contact with the resin sheet thereon, and being disposed above a generatrix of the said driving cylinder, separate means for mounting each pair of said disc knives on said apparatus, the mounting means being adjustable to permit the oblique positioning of the disc knives with respect to the direction of said generatrix, means yielding uring each pair of said idling disc knives toward the driving cylinder, and rotating transverse cutting knives and scrapers adjacent opposite end regions of the driving cylinder, pivoted means carried by the apparatus above the cylinders for mounting the transverse cutting knives and the scrapers, the transverse cutting knives being disposed thereby frontally of the driving cylinder, said obliquely disposed idling disc knives effecting the turning over of the resin and movement thereof along the driving cylinder.

References Cited in the file of this patent

UNITED STATES PATENTS

| 459,095 | Hasenau | Sept. 8, 1891 |
| 1,089,467 | Gammeter | Mar. 10, 1914 |
| 1,402,160 | Gwozdz | Jan. 3, 1922 |
| 1,730,196 | De Pamphilis | Oct. 1, 1929 |
| 1,751,116 | Walton | Mar. 18, 1930 |
| 2,341,651 | Raschig | Feb. 15, 1944 |
| 2,478,885 | Alvey | Aug. 9, 1949 |
| 2,652,590 | Sullivan et al. | Sept. 22, 1953 |
| 2,730,755 | Hale et al. | Jan. 17, 1956 |

FOREIGN PATENTS

| 25.737 | Great Britain | Nov. 5, 1897 |